(12) United States Patent
Graeber et al.

(10) Patent No.: US 9,542,630 B2
(45) Date of Patent: Jan. 10, 2017

(54) METHOD OF SECURELY READING DATA FROM A TRANSPONDER

(75) Inventors: Frank Graeber, Seester (DE); Wolfgang Tobergte, Halstenbek (DE)

(73) Assignee: NXP B.V., Eindhoven (NL)

( * ) Notice: Subject to any disclaimer, the term of this patent is extended or adjusted under 35 U.S.C. 154(b) by 2215 days.

(21) Appl. No.: 11/914,964

(22) PCT Filed: May 19, 2006

(86) PCT No.: PCT/IB2006/051593
§ 371 (c)(1),
(2), (4) Date: Nov. 20, 2007

(87) PCT Pub. No.: WO2006/123316
PCT Pub. Date: Nov. 23, 2006

(65) Prior Publication Data
US 2008/0192932 A1 Aug. 14, 2008

(30) Foreign Application Priority Data
May 20, 2005 (EP) .................................... 05104296

(51) Int. Cl.
*G06K 17/00* (2006.01)
*G06K 7/00* (2006.01)

(52) U.S. Cl.
CPC ............. *G06K 17/00* (2013.01); *G06K 7/0008* (2013.01); *G06K 2017/0067* (2013.01)

(58) Field of Classification Search
CPC .... H04W 12/06; G07C 9/00309; G06F 21/00; G06F 21/35; H04L 63/08; G06K 17/00; G06K 7/0008; G06K 2017/0067
(Continued)

(56) References Cited

U.S. PATENT DOCUMENTS 6,130,623 A * 10/2000 MacLellan et al. ........... 340/5.1
6,515,575 B1 2/2003 Kataoka
(Continued)

FOREIGN PATENT DOCUMENTS

JP 2002337426 A 11/2002
JP 2004240709 A 8/2004
(Continued)

OTHER PUBLICATIONS

Finkenzeller, Klaus: "RFID—Handbuch: Grundlagen Und Praktische Anwendungen Induktiver Funkanlagen, Transponder Und Kontaktloser Chipkarten: 8. Datensicherheit" RFID Handbook: Grundlagen Und Praktische Anwendungen, 2002, pp. 225-231 (in English Translation the Pages are 221-227).
(Continued)

*Primary Examiner* — Tamara T Kyle

(57) ABSTRACT

The invention discloses a method of reading data (dat) from a first transponder (TAG1) into a transceiver (REA). Said (dat) are only transmitted from the first transponder (TAG1) to the transceiver (REA) when a second transponder (TAG2) is present within the RFID communication range of the transceiver (REA) and if a positive authentication procedure between the two transponders (TAG1, TAG2) within the RFID communication range of the transceiver (REA) takes place. The second transponder (TAG2) is preferably a stationary transponder (TAG2), whereas the first transponder (TAG1) may be a mobile transponder. The invention further relates to transponders (TAG1, TAG2) as well as to a transceiver (REA) used in such a method of reading data (dat). Furthermore, the invention relates to a poster (POS), to which a first transponder (TAG1) is attached, and to a poster wall (WAL) for attaching such a poster (POS) and a second transponder (TAG2).

13 Claims, 4 Drawing Sheets

(58) Field of Classification Search
USPC .......................................................... 713/172
See application file for complete search history.

(56) References Cited

U.S. PATENT DOCUMENTS

| | | |
|---|---|---|
| 6,717,507 B1 | 4/2004 | Bayley et al. |
| 6,827,279 B2 | 12/2004 | Teraura |
| 7,600,129 B2* | 10/2009 | Libin et al. .................... 713/185 |
| 7,861,294 B2* | 12/2010 | Onno et al. ...................... 726/20 |
| 2003/0005300 A1 | 1/2003 | Noble et al. |
| 2003/0088794 A1* | 5/2003 | Agam et al. .................. 713/202 |
| 2003/0217267 A1 | 11/2003 | Kindberg |
| 2004/0000997 A1 | 1/2004 | Stevens, III |
| 2004/0029563 A1 | 2/2004 | Berg |
| 2004/0049451 A1* | 3/2004 | Berardi et al. ................... 705/39 |
| 2004/0054594 A1 | 3/2004 | Forster et al. |
| 2004/0073792 A1* | 4/2004 | Noble et al. .................... 713/168 |
| 2004/0250074 A1* | 12/2004 | Kilian-Kehr .................. 713/172 |
| 2005/0064867 A1 | 3/2005 | Nitta |
| 2009/0282253 A1* | 11/2009 | Rose et al. .................... 713/172 |
| 2012/0024951 A1 | 2/2012 | Graeber |

FOREIGN PATENT DOCUMENTS

| | | |
|---|---|---|
| WO | 01/94967 A2 | 12/2001 |
| WO | 2003073370 A1 | 9/2003 |
| WO | 2004039599 A1 | 5/2004 |
| WO | 2004086290 A1 | 10/2004 |

OTHER PUBLICATIONS

ISO14443A (International Standard). See mifare product sheet (MF RC530) as referenced in the application. Revision 3.2, Dec. 2005.

\* cited by examiner

METHOD OF SECURELY READING DATA FROM A TRANSPONDER

FIELD OF THE INVENTION

The invention relates to a method of reading data from a first transponder into a transceiver, a transponder for communication with a further transponder via a transceiver, a transceiver for controlling the communication of two transponders, a poster equipped with a transponder, and a poster wall equipped with a poster and a transponder.

BACKGROUND OF THE INVENTION

Identification products such as smart cards and RFID ("Radio Frequency Identification") tags (hereinafter referred to as "transponder") are widely used in the field of transport (ticketing, road tolling, baggage tagging), finance (debit and credit cards, electronic purse, merchant card), communication (SIM cards for GSM phones), and tracking (access control, inventory management, asset tracking). International standard ISO14443A is an industry standard for contactless smart cards. ISO14443A-compliant products such as MIFARE™ provide RF communication technology for transmitting data between a card or a tag and a reader device (hereinafter referred to as "transceiver"). For example, in electronic ticketing for public transport, travelers just wave their card over a reader at the turnstiles or entry point, benefiting from improved convenience and speed in the ticketing process. Such products are set to be the key to individual mobility in the future, supporting multiple applications including road tolling, airline tickets, access control and many more.

Evolving from a combination of contactless identification and networking technologies, Near Field Communication (NFC) is a very short-range wireless technology for distances measured in centimeters, and is optimized for intuitive, easy and secure communication between various devices without user configuration. In order to make two devices communicate, users bring them close together or even make them touch each other. The NFC interfaces of these devices will automatically connect and configure themselves to form a peer-to-peer network. NFC can also bootstrap other protocols like Bluetooth™ or Wireless Ethernet (WiFi) by exchanging the configuration and session data. NFC is compatible with contactless smart card platforms. This enables NFC devices to read information from these cards, making contactless smart cards the ideal solution for bringing information and vouchers into the NFC world. NFC interfaces are nowadays widely used in mobile phones and other mobile devices.

For example, "smart posters" are known as arbitrary or advertising poster placards, which are equipped with a transponder, such as a passive RFID tag. The data stored on the transponder can be read by using a transceiver, which may be embodied as a traditional smart card reader/writer or as an NFC-enabled mobile device such as a mobile phone.

The data may be stored directly on the transponder or—in a typical smart poster application—the "data" are stored in the form of a URL ("Uniform Resource Locator") on the transponder, which URL represents a link or a reference to a designated service, resource or to the "real" data. By touching the smart poster with the transceiver, the phone automatically establishes a connection (for example, a GPRS connection) to a remote web server and loads the content/data as referenced by the URL to the transceiver.

Specific solutions sometimes make it necessary that a transponder, such as the above-mentioned RFID tag or a contactless smart card, only works at a specific position/location or in a specific, defined region. Especially a smart poster as mentioned above will only work at specific, designated locations, and must not work anywhere else. For example, if a transponder (or the corresponding smart poster) is used in a public transportation system for a check-in into this system, a user has to "touch" a smart poster to check in. Using this procedure, the user "buys" a ticket for the public transportation system.

For such an application, it is mandatory that the check-in process only works at the specific location where the smart poster has been installed by the public transport operator. If this requirement were not realized, a malicious user could remove the smart poster with the transponder for the check-in (or the transponder from the poster), then enter the public transportation system, and if he recognized a conductor, he could check in by touching the stolen smart poster or the stolen smart poster transponder. In such a situation, it must be guaranteed that the smart poster or the smart poster transponder must not work if it has been removed from its designated location, and it must be guaranteed that the check-in process is bound to the designated location.

In another example, in which it is necessary that a transponder (on, for example, a poster) only works at a specific location, the operator of said transponder, which may have stored certain information for different consumers, etc., is interested in measuring and evaluating the number and/or the frequency of touches to a certain transponder at a specific location, so that the operator can identify attractive locations for installing such transponders/posters. Here, the functionality of the smart poster tags must also be location-dependent.

A state-of-the-art solution for preventing misuse of such transponders or smart posters which must operate only at a specific, designated location is to protect the smart poster or at least the transponder against illegal theft by structural (hardware) means, for example, by providing theft protection in the form of proof glass, so that the smart poster/transponder is protected against theft and vandalism. This solution has the disadvantage that it is very costly for the operator of the transponder.

Especially when the smart poster applications are time-terminated applications, i.e. the data provided by the transponder are only valid for a certain period of time, it is required that the smart posters or the transponder are removed or that at least the transponder has to be deactivated when the smart poster application has been terminated. Structural (hardware) means for protecting the transponder/smart poster against theft has to consider this aspect, which also affects the operational costs.

OBJECT AND SUMMARY OF THE INVENTION

It is an object of the invention to provide a method, a transponder, a transceiver, a poster, and a poster wall of the type mentioned in the opening paragraph, which obviate the drawbacks described above.

In particular, it is an object of the invention to provide a cheap and easy-to-install solution which allows preventing misuse of such transponders or smart posters which must operate only at a specific, designated location.

To achieve the object described above, a method according to the invention has such characteristic features that it can be characterized as follows:

A method of reading data from a first transponder into a transceiver, wherein the transceiver performs the following steps when said first transponder and a second transponder are within the RFID communication range of the transceiver at the same time:
- receiving exchange information from the first transponder after sending a request for transmitting data to said first transponder,
- transmitting said exchange information to said second transponder,
- receiving encrypted information from the second transponder, which encrypted information represents the exchange information of the first transponder, scrambled with a key of the second transponder,
- transmitting said encrypted information to the first transponder, and
- provided that the first transponder permits access to the data, receiving the requested data from the first transponder.

The inventive object is also solved by a transponder for communicating with a further transponder via a transceiver, wherein the transponder comprises
- means for generating exchange information,
- means for transmitting said exchange information to a transceiver,
- means for receiving encrypted information from said transceiver,
- means for decrypting said encrypted information, and
- means for comparing the resulting information of the decryption of the encrypted information with the exchange information generated with the generating means.

The object of the invention is further solved by a transponder for communicating with a further transponder via a transceiver, wherein the transponder comprises
- means for receiving exchange information from a transceiver,
- means for encrypting said exchange information, and
- means for transmitting encrypted information resulting from the encryption of said exchange information to the transceiver.

Yet another solution for the inventive object is a transponder for communicating with a further transponder via a transceiver, wherein the transponder comprises
- means for generating exchange information,
- means for transmitting said exchange information and for transmitting encrypted information resulting from the encryption of received exchange information to the transceiver,
- means for receiving encrypted information and for receiving exchange information from a transceiver,
- means for decrypting said encrypted information,
- means for comparing the resulting information of the decryption of the encrypted information with the exchange information generated with the generating means, and
- means for encrypting said exchange information.

To achieve the inventive object, also a transceiver for controlling the communication of two transponders is disclosed, wherein the transceiver comprises
- means for receiving exchange/encrypted information from the first/second transponder, and
- means for transmitting, to the second/first transponder, exchange/encrypted information received from the first/second transponder, which exchange/encrypted information is intended to be transmitted to the second/first transponder.

Yet another solution for the inventive object is a transceiver, which comprises means for receiving data from one of the transponders.

Finally, the object of the invention is solved by a poster, wherein a transponder is attached to said poster, as well as by a poster wall comprising said poster.

The provision of the characteristic features according to the invention creates the advantage that the transceiver is provided with data from a first transponder only if said transponder is close to a second transponder, i.e. both transponders have to be within the communication range of the transceiver. In this case, communication of the transponders via the transceiver will take place when the transceiver comes close to the transponders. The first transponder which carries the data verifies if the second transponder is present and access is granted to the data stored on said first transponder only if the presence of the second transponder can be verified. Access to the data stored on the first transponder is automatically disabled when the first transponder is removed from the second one.

The invention offers the advantage that it is not necessary to secure the first transponder against theft by using other cost-intensive solutions such as structural means. The invention therefore allows mobility of the first transponder.

The solution according to the invention uses standardized communication between a transponder and a transceiver as well as a standard authentication procedure which is well-known in the state of the art between a transponder and a transceiver so that the invention may be realized within an existing transceiver infrastructure. However, since such an authentication works at any place where the transponder and the transceiver come close together, a second transponder is used, so that an authentication is only possible if both transponders are within the communication range of the transceiver at the same time.

It is also known in the state of the art that a further server which is capable of communicating with the transponder via the transceiver is used for an authentication procedure, and U.S. Pat. No. 6,717,507 discloses a method of accessing and controlling a media source by reading out information from a transponder with a reader.

However, all of these known solutions are not suitable to avoid removal of a transponder from a specific location because the functioning of the authentication of a transponder or access to, or control of, a media source does not depend on the position of the transponder with respect to the server or on the position of the media source with respect to the position of the transponder.

However, concerning the invention as claimed, it is necessary that both transponders are within the RFID communication range at the same time so that the authentication procedure can work. When a transponder is removed from its position, the authentication will not work anymore and access to the data stored on the first transponder is denied.

It is advantageous when the transceiver performs the following steps after sending the request to the first transponder and before receiving said exchange information from the first transponder:
- receiving further, first exchange information from the second transponder,
- transmitting said first exchange information to the first transponder,
- receiving first encrypted information from the first transponder, which first encrypted information represents the exchange information of the second transponder, scrambled with a key of the first transponder, and transmitting said first encrypted information to the second transponder.

This provides an additional authentication procedure between the two transponders. Such an authentication procedure makes it possible that the first transponder and the second transponder are operated by different persons, organizations or enterprises, because the service offered by the second transponder, namely that the first transponder only provides data to a reader when the second transponder is close to the first transponder, may only be claimed if the first transponder authenticates itself to the second transponder.

It is also advantageous when the second transponder is a stationary, immobile transponder. This provides the advantage that it is not possible for a malicious person to remove the first and the second transponder together. Providing structural means against theft of the second transponder will involve additional costs. However, since in contrast to the first transponder, the second transponder usually has to be installed only once, these measures increase security at relatively low cost.

Yet another beneficial solution is a method wherein the exchange information is a random number. The security of communication can thereby be improved because the use of a random number as exchange information provides the advantage that so-called "replay attacks" are not possible.

Furthermore, it is advantageous when both transponders are passive transponders and/or when the first and the second transponder are identical. This provides the advantage of low cost.

It is also beneficial when the transponder comprises memory means for storing data and/or for storing keys being used in the encryption and/or decryption of exchange/ encrypted information. The authentication process can thus take place very fast as keys do not have to be fetched from a remote location.

It is also advantageous when the transceiver comprises means for receiving data from one of the transponders.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting example, with reference to the embodiments shown in the drawings.

DESCRIPTION OF EMBODIMENTS

Figure 1:
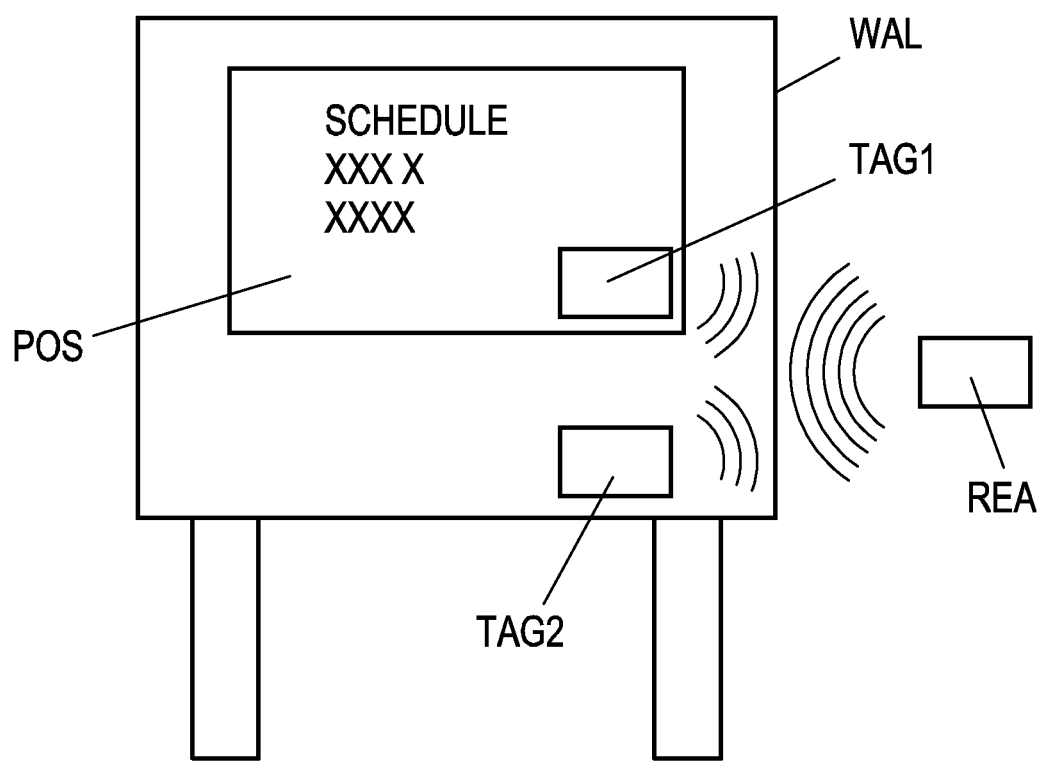
FIG. 1 shows a possible application of the invention.

FIG. 1 shows a poster POS with the schedule of a public transportation system. A first transponder TAG1 is attached to said poster POS. To buy a ticket for the public transportation system, a user brings his transceiver REA close to the first transponder TAG1 so that the relevant data dat (See FIG. 2) may be transferred from the first transponder TAG1 to the transceiver REA.

It should be noted that the relevant data dat may be stored directly on the first transponder TAG1. However, it is also possible that only a reference, such as a URL to said data dat is stored on the first transponder TAG1 and that the data itself are stored on a remote server. The reader REA may then obtain said data from the server using said reference such as a URL, for example, by establishing a GPRS connection to said reference. In the context of this document, both situations will be covered by the phrase "data dat being stored on the first transponder TAG1".

The poster POS is attached to a poster wall WAL. A second transponder TAG2 is attached to said poster wall WAL so that the first transponder TAG1 and the second transponder TAG2 are close together. Both transponders TAG1, TAG2 are RFID-tags which are preferably passive. Furthermore, it is possible that identical transponders TAG1, TAG2 are used.

A user who wants to read data dat from the first transponder TAG1 has to "touch" the first transponder TAG1 with his transceiver REA, which means that he has to bring his transceiver REA close to the first transponder TAG1 so that the first transponder TAG1 is within the RFID communication range of the transceiver REA.

Since the first transponder TAG1 and the second transponder TAG2 are close together, both transponders TAG1, TAG2 are powered and operated within one electromagnetic field generated by the transceiver REA. The transceiver REA is capable of communicating to each transponder TAG1, TAG2 individually and communication of the two transponders TAG1, TAG2 can be realized via the reader REA. The transceiver REA thus controls the communication of the two transponders TAG1, TAG2.

The second transponder TAG2 is non-detachably arranged on the poster wall WAL which is protected against theft and vandalism of the second transponder TAG2, e.g. the second transponder TAG2 is positioned in a concrete block of the poster wall WAL or the second transponder TAG2 is protected against theft and/or vandalism by other structural means such as proof glass.

The essential idea of the invention is that the first transponder TAG1 declines communication access to the transceiver REA as long as the second transponder TAG2 has not authenticated the first transponder TAG1. Thus the first transponder TAG1 only grants access to the data stored on it if the second transponder TAG2 authenticates the first transponder TAG1 by applying proper cryptographic protocols. This arrangement binds the first transponder TAG1 to the designated location by logical means rather than by structural means.

The poster POS and the corresponding first transponder TAG1 and the poster wall WAL with the second transponder TAG2 may be operated by the same operator. However, the poster POS and the poster wall WAL will usually be operated by different operators. The first transponder TAG1 may be operated by a first enterprise ("application provider") which offers a certain application by storing corresponding data dat on the first transponder TAG1, which data dat can be read from the first transponder. In the present case, the application provider allows buying a mobile ticket for the public transportation system. The second transponder TAG2 is operated by a second enterprise ("service provider").

Before communication according to the invention may be established, it is necessary to "personalize" the different transponders. This means that the key or keys of the "application provider" and the "service provider" necessary for a positive authentication procedure have to be stored on the corresponding transponders.

The personalization of the first transponder TAG1 should be carried out in a safe and secure environment, for example, in the poster printing plant, in the poster delivery station or during placement of the poster POS at the poster wall WAL ("Pre-Issuance personalization in a secure environment").

Figure 2:
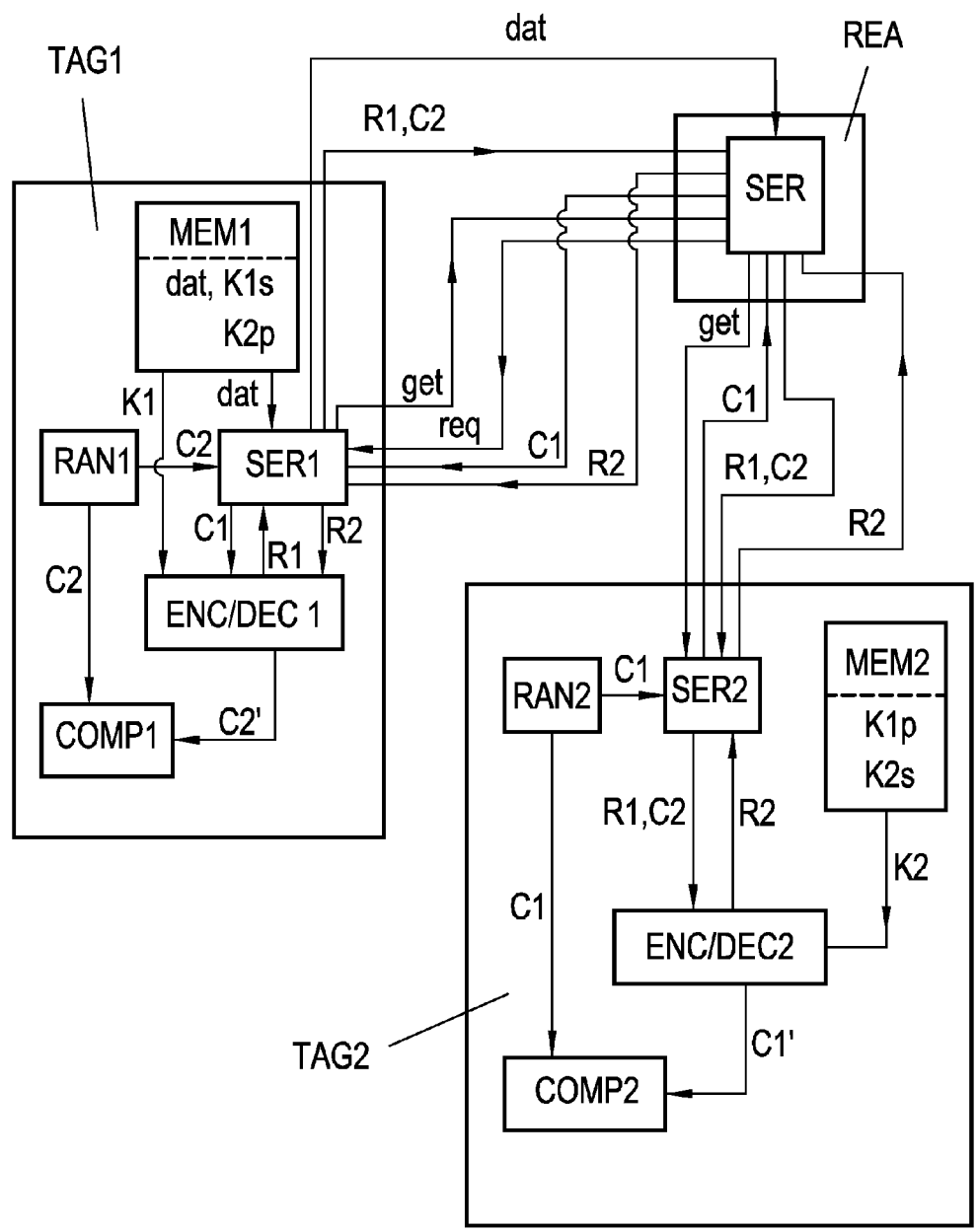
FIG. 2 shows a first and a second transponder communicating via a transceiver according to the invention.

FIG. 2 shows, in greater detail, a first transponder TAG1 and a second transponder TAG2 communicating via a transceiver REA. The first transponder TAG1 comprises sending/receiving means SER1 for sending information such as exchange information C2 and encrypted information R1 to the transceiver REA. Furthermore, said sending/receiving means SER1 are adapted to receive information such as exchange information C1 and encrypted information R2 from the transceiver REA.

The first transponder TAG1 also comprises means RAN1 for generating exchange information C2, which exchange information C2 is usually a random number. Furthermore, encoding/decoding means ENC/DEC1 are provided for encrypting exchange information C1 received from the second transponder TAG2 via the transceiver REA into encrypted information R1 and for decrypting encrypted information R2 received from the second transponder TAG2 via the transceiver REA into decrypted information C2'.

The first transponder TAG1 further comprises means COMP1 for comparing the exchange information C2, generated with the exchange information-generating means RAN1, and the above-mentioned decrypted information C2'. Finally, memory means MEM1 are provided for storing data dat and keys K1$s$, K2$p$ which are necessary for the authentication procedures according to the invention.

The second transponder TAG2 comprises sending/receiving means SER2 for sending information such as exchange information C1 and encrypted information R2 to the transceiver REA. Furthermore, said sending/receiving means SER2 are adapted to receive information such as exchange information C2 and encrypted information R1 from the transceiver REA.

The second transponder TAG2 also comprises means RAN2 for generating exchange information C1 which is usually a random number. Furthermore, encoding/decoding means ENC/DEC2 are provided for encrypting exchange information C2 received from the first transponder TAG1 via the transceiver REA into encrypted information R2 and for decrypting encrypted information R1 received from the first transponder TAG1 via the transceiver REA into decrypted information C1'.

The second transponder TAG2 further comprises means COMP2 for comparing the exchange information C1, generated with the exchange information-generating means RAN2, and the above-mentioned decrypted information C1'. Finally, memory means MEM2 are provided for storing keys K1$p$, K2$s$ which are necessary for the authentication procedures according to the invention.

Asymmetric ciphering as well as symmetric ciphering may be used in the communication process between the two transponders TAG1, TAG2. In the case of symmetric ciphering, the keys for encrypting and decrypting are identical, which makes it necessary that the keys are exchanged in a secure environment. Symmetric ciphering provides the advantage that only little "computing power" is necessary and that there are only small memory requirements as far as the memory of the transponders is concerned. However, asymmetric ciphering provides the advantage that it is not necessary that keys are exchanged in a secure environment.

In FIG. 2, it is assumed that asymmetric ciphering is used, with a first pair of a public key K1$p$ and a secret key K1$s$ of the first transponder TAG1 and a second pair of a public key K2$p$ and a secret key K2$s$ of the second transponder TAG2. The secret key K1$s$ of the first transponder TAG1 and the public key K2$p$ of the second transponder TAG2 are stored on the first transponder TAG1, whereas the secret key K2$s$ of the second transponder TAG2 and the public key K1$p$ of the first transponder TAG1 are stored on the second transponder TAG2.

FIG. 2 also depicts a transceiver REA which comprises sending/receiving means SER designed to receive and send information C1, C2, R1, R2 as well as data dat from the first and the second transponder TAG1, TAG2.

Figure 3:
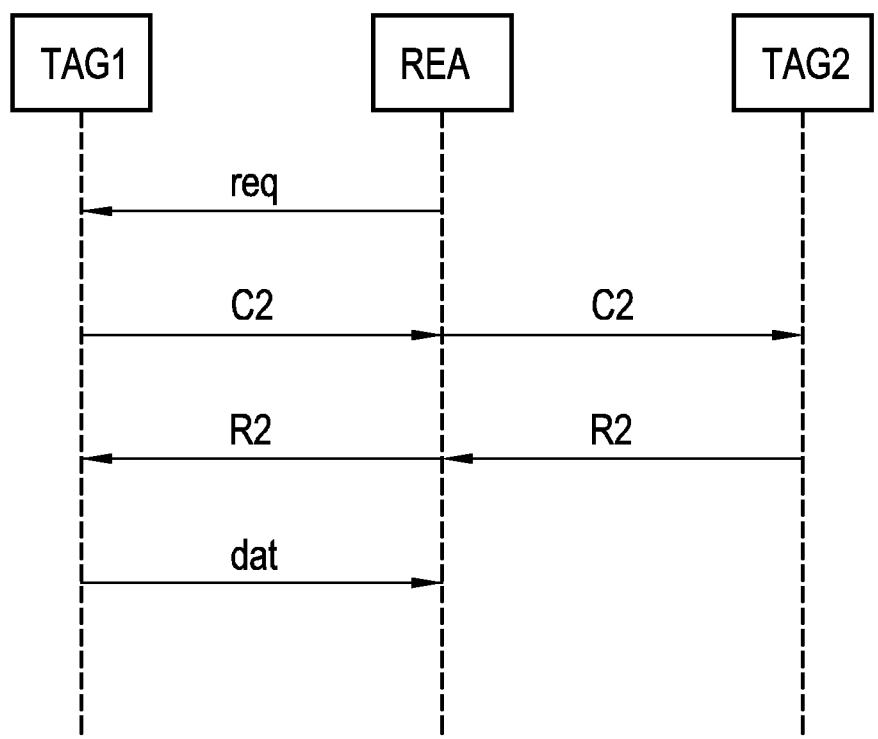
FIG. 3 is a flow chart of a first embodiment of the method according to the invention.

FIG. 3 shows the main aspects of a method according to the invention in a simple manner. First of all, the transceiver REA sends a request req to the first transponder TAG1, with which request req the transceiver REA requests the transmission of data dat stored on the first transponder TAG1. The first transponder TAG1 denies this request and generates exchange information C2 which is then transmitted to the transceiver REA. The transceiver REA transmits the exchange information C2 to the second transponder TAG2, where said exchange information C2 is encrypted to encrypted information R2. Said encrypted information R2 is now transmitted to the first transponder TAG1 via the transceiver REA.

The first transponder TAG1 decrypts said encrypted information R2 to decrypted information C2'. Said decrypted information C2' is compared with the original exchange information C2. When the original information C2 and the decrypted information C2' are identical, the first transponder TAG1 transmits the data dat requested to the transceiver REA.

Since this authentication procedure only works when the first transponder TAG1 and the second transponder TAG2 are close together within the RFID communication range of the transceiver REA, the first transponder TAG1 will provide the data dat stored on it to a transceiver REA only in a certain, well-defined region.

A method as described in FIG. 3 is used when both transponders TAG1, TAG2 are operated by the same "provider". Especially when symmetric ciphering is used and the used key for encryption and decryption is secret, the service of "binding the first transponder TAG1 to a specific location" can only be provided to the owner of the secret key.

Figure 4:
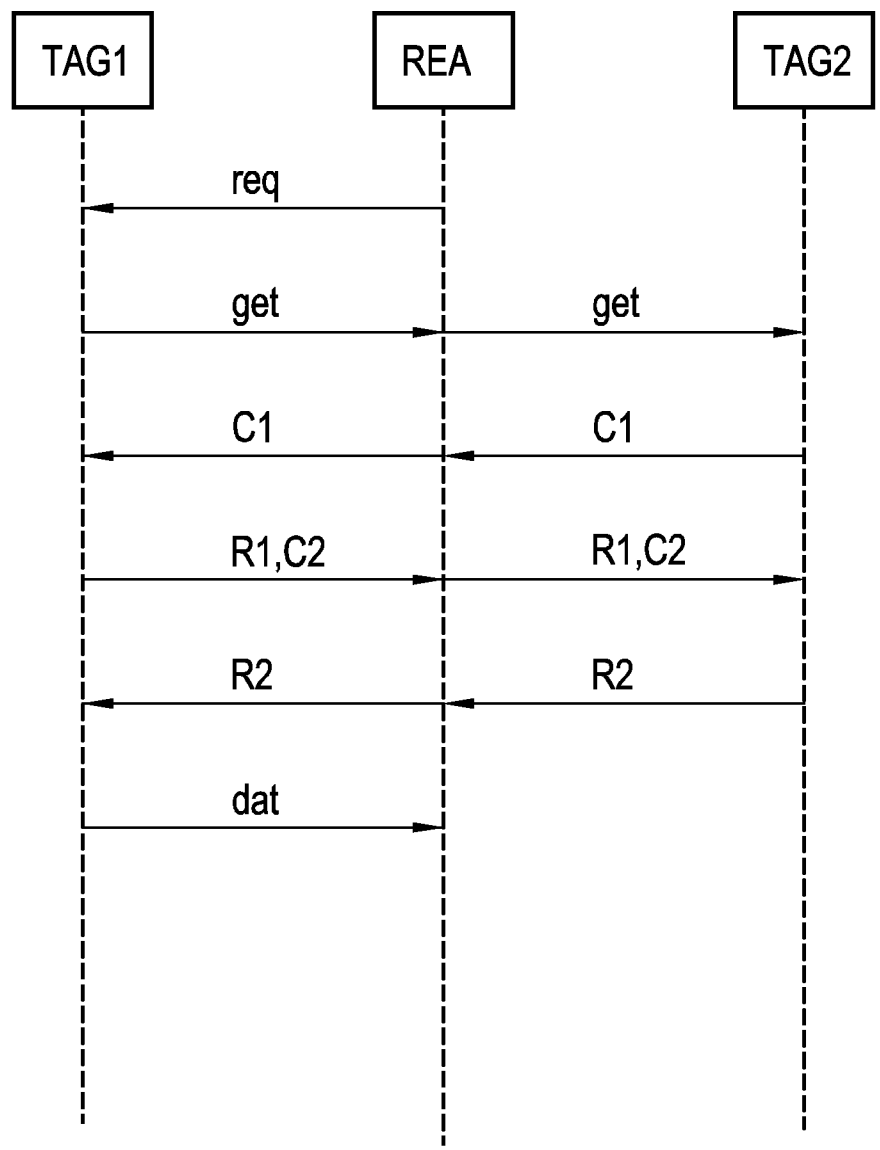
FIG. 4 is a flow chart of a second embodiment of the method according to the invention.

When the transponders TAG1, TAG2 are operated by different providers, an additional authentication procedure is advantageous, which will be explained in detail in FIG. 4. In FIG. 4, it is assumed that asymmetric ciphering is applied. According to the method as shown in FIG. 4, the transceiver REA sends a request req to the first transponder TAG1. The first transponder TAG1 requests exchange information from the second transponder TAG2 by transmitting a get-signal get to the second transponder TAG2 via the transceiver REA. The second transponder TAG2 transmits exchange information C1 to the first transponder TAG1 via the transceiver REA.

The first transponder TAG1 encrypts said exchange information C1 to encrypted information R1 with the secret key K1$s$. Said encrypted information R1 is transmitted to the second transponder TAG2 via the transceiver REA. Furthermore, exchange information C2 of the first transponder TAG1 is transmitted to the second transponder TAG2.

The second transponder TAG2 first decrypts the encrypted information R1 from the first transponder TAG1 to decrypted information C1' with the public key K1$p$, which decrypted information C1' is then compared with the original exchange information C1 sent to the first transponder TAG1. When both information C1, C1' is identical, the authentication of first transponder TAG1 to the second transponder TAG2 has been successful. In the case of a successful authentication, the second transponder TAG2 then encrypts the exchange information C2 received from the first transponder TAG1 with the secret key K2s to encrypted information R2 which is then transmitted to the first transponder TAG1 via the transceiver REA.

The first transponder TAG1 decrypts said encrypted information R2 to decrypted information C2' with the public key K2p. Said decrypted information C2' is compared with the original exchange information C2. When the original information C2 and the decrypted information C2' are identical, the first transponder TAG1 transmits the data dat requested to the transceiver REA.

Since this authentication procedure only works when the first transponder TAG1 and the second transponder TAG2 are close together within the communication range of the transceiver REA, the first transponder TAG1 will provide the data dat stored on it to a transceiver REA only in a certain, well-defined region.

The advantages obtained by the inventive solution as compared to state-of-the-art solutions are as follows.

Low cost, all transponders may be passive tags.

It is not mandatory that the second transponder TAG2 stores application-specific data; hence, application-specific personalization of the second transponder TAG2 is superfluous. The operational costs for the second transponder TAG2 will be reduced to a minimum.

The application-specific personalization of the first transponder TAG1 can be performed within production time. It is not mandatory to personalize the first transponder TAG1 in the field (post-issuance personalization). This has the advantage that erroneous personalization in the field is not possible.

Simplicity: The key management is simple. The easy key management enables separate providers for the first transponder TAG1 and the second transponder TAG2. The operator of the first transponder TAG1 and the operator of the second transponder TAG2 do not need to work under the same trust model, i.e. they do not need to share a common secret key. A security-relevant key exchange and thus a complicated process of key exchange are superfluous.

Simplicity: Placement of the (smart) poster POS does not need any mechanical protection.

Security: The posters POS are safeguarded against removal from the designated poster location. The invention provides protection against placement of posters at unwanted locations.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. Use of the verb "comprise" and its conjugations does not exclude the presence of elements or steps other than those stated in any claim or the specification as a whole. The singular reference of an element does not exclude the plural reference of such elements, and vice-versa. In a device claim enumerating several means, several of these means may be embodied by one and the same item of hardware or software. The mere fact that certain measures are recited in mutually different dependent claims does not indicate that a combination of these measures cannot be used to advantage.

The invention claimed is:

1. A method of reading data from a first passive RFID transponder into a transceiver, the method comprising: limiting access to data stored on the first transponder only if the presence of a second passive RFID transponder can be verified by verifying that said first transponder and the second transponder are within an RFID communication range of the transceiver at the same time, the verification including:
    transmitting a request from the transceiver to the first transponder, the request being for the data stored at the first transponder,
    at the transceiver, receiving exchange information generated by said first transponder in response to the request,
    transmitting said exchange information from the transceiver to said second transponder,
    at the transceiver, receiving encrypted information transmitted from the second transponder in response to the exchange information, the encrypted information representing further exchange information, that is different from the exchange information, transmitted by the first transponder scrambled with a key of the second transponder,
    transmitting said encrypted information from the transceiver to the first transponder, and
    communicating the requested data from the first transponder to the transceiver based on said encrypted information transmitted to the first transponder.

2. A method as claimed in claim 1, wherein the exchange information generated by the first transponder is encrypted by a private key of the first transponder.

3. A method as claimed in claim 1, wherein the second transponder is a stationary, immobile transponder.

4. A method as claimed in claim 2, wherein the exchange information is a random number that is independent from the stored data, and receiving the encrypted information transmitted from the second transponder includes receiving encrypted information generated by the second transponder based on the first encrypted information.

5. A method as claimed in claim 1, wherein the first and the second transponder are passive transponders.

6. A method as claimed in claim 1, wherein the first and the second transponder are identical.

7. A transceiver for controlling the communication of two transponders, wherein a first of the two transponders is adapted to verify if a second of the two transponders is present and access is granted to data stored on the first transponder only if the presence of the second transponder can be verified, the transceiver comprising:
    means for requesting access to the stored data on the first transponder, and for directing the first transponder to generate exchange information in response to the requested access;
    means for receiving first exchange information and encrypted second exchange information from the first transponder generated in response to the requested access, and for receiving encrypted first information and second exchange information from the second transponder; and
    means for transmitting to the second transponder said first exchange information and encrypted second exchange information received from the first transponder, and for transmitting to the first transponder said encrypted first information from the second transponder.

8. A method comprising:
    communicating, from an RFID transceiver, a data request for data to a first passive RFID transponder;
    receiving, from the first passive RFID transponder, a get request for exchange information;

communicating, from the RFID transceiver, the get request to a second passive RFID transponder;
generating a first exchange information;
storing the first exchange information;
receiving, at the RFID transceiver, the first exchange information from the second passive RFID transponder;
communicating, from an RFID transceiver, the first exchange information to the first passive RFID transponder;
generating a second exchange information;
storing the second exchange information;
encrypting the first exchange information using a private key;
receiving, at the RFID transceiver, the second exchange information and the encrypted first exchange information from the first passive RFID transponder;
communicating, from an RFID transceiver, the second exchange information and the encrypted first exchange information to the second passive RFID transponder;
decrypting the encrypted first exchange information using a public key to generate a decrypted version of first exchange information;
comparing the decrypted version of the first exchange information to the stored first exchange information;
encrypting, in response to the comparison of the first exchange information, the second exchange information using a private key;
receiving, at the RFID transceiver, the encrypted second exchange information from the second passive RFID transponder;
communicating, from an RFID transceiver, the encrypted second exchange information to the first passive RFID transponder;
decrypting the encrypted second exchange information using a public key to generate a decrypted version of second exchange information;
comparing the decrypted version of the second exchange information to the stored second exchange information; and
communicating, in response to the comparison of the second exchange information, data corresponding to the data request from the first passive RFID transponder.

9. The method of claim 8, wherein the steps of generating the first exchange information and generating the second exchange information each include generating a corresponding random number used in the exchange information.

10. The method of claim 8, wherein the data corresponding to the data request includes toll data for a public transportation.

11. The method of claim 8, wherein the transceiver is a smart card.

12. The method of claim 8, wherein the data corresponding to the data request includes a URL designating a remote server.

13. The method of claim 8, further including the step of denying access to the data corresponding to the data request from the first passive RFID transponder in response to either step of comparing failing to show correspondence between the respective compared exchange information.

* * * * *